United States Patent

Toyofuku et al.

[11] Patent Number: 5,767,906
[45] Date of Patent: Jun. 16, 1998

[54] VIEWFINDER MOUNTING FOR VIDEO CAMERA

[75] Inventors: Hidenori Toyofuku, Toyonaka; Motoyoshi Sogabe, Saijyo, both of Japan

[73] Assignee: Matsushita Electric Industrial Co., Ltd., Kadoma, Japan

[21] Appl. No.: 567,267

[22] Filed: Dec. 5, 1995

[30] Foreign Application Priority Data

Apr. 12, 1995 [JP] Japan ..................... 7-086858

[51] Int. Cl.$^6$ ..................... H04N 5/225
[52] U.S. Cl. ..................... 348/375; 348/333; 396/383
[58] Field of Search ..................... 348/373, 375, 348/376, 333; 396/374, 383, 378

[56] References Cited

U.S. PATENT DOCUMENTS

| | | | |
|---|---|---|---|
| 4,389,675 | 6/1983 | Suzuki et al. | 348/376 |
| 4,591,254 | 5/1986 | Sokolowski. | |
| 4,682,240 | 7/1987 | Bachman | 396/383 |

FOREIGN PATENT DOCUMENTS

| | | | |
|---|---|---|---|
| 57-171324 | 10/1982 | Japan. | |
| 64-15471 | 1/1989 | Japan. | |
| 5145808 | 6/1993 | Japan | H04N 5/225 |
| 6022184 | 1/1994 | Japan | H04N 5/225 |
| 6233160 | 8/1994 | Japan | H04N 5/225 |
| 2 073 989 | 10/1981 | United Kingdom. | |

*Primary Examiner*—Wendy Garber
*Attorney, Agent, or Firm*—Ratner & Prestia

[57] ABSTRACT

A viewfinder mounting for mounting a viewfinder on a camera body for adjustable movement in a common plane in two directions perpendicular to each other. This viewfinder mounting includes a first slide mechanism including first and second slide members coupled with each other for sliding movement relative to each other, and a second slide mechanism including third and fourth slide members coupled with each other for sliding movement relative to each other. A camera fixture is employed to connect the first slide member to the camera body, and a viewfinder fixture is also employed to connect the fourth slide member to the viewfinder. A holder connects the second and third slide members with each other to render the first and second slide members to lie perpendicular to each other. A slide lock mechanism is provided for releasably locking the viewfinder fixture and the camera fixture relative to each other.

28 Claims, 4 Drawing Sheets

VIEWFINDER MOUNTING FOR VIDEO CAMERA

BACKGROUND OF THE INVENTION

1. Field of the Invention

The present invention generally relates to the mounting of a viewfinder on a video camera and, more particularly, to a viewfinder mounting for mounting the viewfinder on a body of the video camera for adjustable movement in a common plane in two directions perpendicular to each other.

2. Description of the Prior Art

While video cameras for home use now available in the market are relatively compact in size and have an integrated viewfinder built therein, professional-grade video cameras for use by professional cameramen are still bulky and are generally mounted on shoulder when in use. Some of the professional-grade video cameras have a releasable and adjustable viewfinder, i.e., the viewfinder that can be separated from a body of the video camera when the necessity arises and, at the same time, adjustable in position in a common plane in two directions perpendicular to each other relative to a body of the video camera. The releasable and adjustable viewfinder requires the use of a viewfinder mounting through which it can be mounted on the body of the video camera.

The prior art viewfinder mounting is disclosed in, for example, the Japanese Laid-open Utility Model Publication No. 1-15471, published in 1989, and is reproduced in FIGS. 6 and 7, reference to which will now be made for detailed discussion thereof.

Referring particularly to FIG. 6, the professional-grade video camera includes a generally rectangular box-like body having a fixed or interchangeable lens assembly fitted to a front wall of the camera body. A generally inverted U-shaped handle 110 having an elongated grip 110b and front and rear upright legs (only the front upright leg being shown by 110a) depending from respective opposite ends of the grip 110b is mounted atop the video camera with respective lower ends of said front and rear upright legs secured to, or otherwise formed integrally with, a top wall of the camera body.

A viewfinder is generally identified by 210, only an end portion thereof opposite to the viewfinder eyepiece (not shown) being shown, and has a generally elongated mount shoe 400 rigidly secured to that end of the viewfinder 210. This elongated mount shoe 400 has a generally C-sectioned slide groove 402 defined therein so as to extend a distance considered necessary for the position of the finder eyepiece to be adjustable relative to the camera body in a direction transverse to the camera aiming direction, i.e., the direction in which the video camera is aimed.

Referring to FIGS. 6 and 7, the prior art viewfinder mounting comprises a longitudinal slide support mechanism 200 for supporting the viewfinder 210 for adjustment in position thereof in a direction parallel to the camera aiming direction. This longitudinal slide support mechanism 200 includes right and left slide rods 201A and 201B, and a transverse connecting plate 205 having opposite ends connected to respective front ends of the right and left slide rods 201A and 201B by means of associated set screws 204A and 204B so as to render the right and left slide rods 201A and 201B to extend parallel to each other. The longitudinal slide support mechanism 200 also includes right and left bearing bushings 202A and 202B having respective bores defined therein for slidable passage therethrough of the right and left slide rods 201A and 201B, and a mounting plate 100 having its opposite ends connected rigidly to, or otherwise formed integrally with, the right and left bearing bushings 202A and 202B. An intermediate portion of the mounting plate 100 is adapted to be secured to a front surface of the front upright leg 110a by means of screw members 101.

To lock the slide rods 201A and 201B relative to the associated bearing bushings 202A and 202B once the position of the viewfinder relative to the camera body in a direction parallel to the camera aiming direction has been chosen, a slide lock 203 is mounted on one of the bearing bushings, for example, the bearing bushing 202B. This slide lock 203 is of a design which when turned an acute angle, a lock screw integral with the slide lock 203 is brought into engagement with the slide rod 201B to lock the latter in position.

The transverse connecting plate 205 has a viewfinder mount of a generally T-shaped configuration including a mount foot 401 slidably engageable in the slide groove 402 of the mount shoe 400 rigid or integral with the viewfinder 210. This viewfinder mount is fixedly secured to an intermediate portion of the transverse connecting plate 205 with a lock ring 403 mounted thereon at a location between the transverse connecting plate 205 and the viewfinder mount foot 401.

The prior art viewfinder mounting is mounted on the camera body with the mounting plate 100 secured to the front surface of the front upright leg 110a by means of the screw members 101. The viewfinder 210 is in turn mounted on the viewfinder mounting with the viewfinder mount foot 400 slidably received in the slide groove 402 of the mount shoe 400 and can be locked in position by fastening the lock ring 403. The transverse position of the viewfinder 201 relative to the camera body in the direction perpendicular to the camera aiming direction can be adjusted by loosening the lock ring 403 and then moving the viewfinder 210 in a direction laterally of the camera body. On the other hand, the position of the viewfinder relative to the camera body in a direction parallel to the camera aiming direction can be adjusted by moving the viewfinder in a direction parallel to the camera aiming direction to cause the slide rods 201A and 201B to slidingly move axially relative to the associated bearing bushings 202A and 202B.

The prior art viewfinder mounting of the structure shown in and described with reference to FIGS. 6 and 7 has been found requiring complicated procedures to lock the viewfinder in position relative to the camera body or to release the viewfinder in readiness for repositioning in two directions perpendicular to each other. In other words, separate and independent procedures are required to adjust the viewfinder relative to the camera body in two directions perpendicular to each other, respectively. For example, assuming that the viewfinder is locked in position relative to the camera body, the lock ring 403 has to be loosened and then fastened after the repositioning of the viewfinder in the transverse direction perpendicular to the camera aiming direction and the slide lock 203 has to be loosened and then fastened after repositioning of the viewfinder in the direction parallel to the camera aiming direction.

In addition, considering that the lock ring 403 is generally made compact in size to render the viewfinder mounting as a whole to be compact and light-weight, it has been found difficult to secure, between the transverse connecting plate 205 and the mount shoe 400, plenty of space sufficient to accommodate therein thumb and index fingers loosely. For this reason, turning the lock ring in either direction requires a skillful and time-consuming manipulating job.

When it comes to removal of the viewfinder 210 from the viewfinder mounting, the lock ring 403 has to be first loosened to allow the mount foot 401 to be freely slidable in the slide groove 402, followed by pull of the viewfinder 210 in a direction parallel to the elongated mount shoe 400 until the mount foot 401 is disengaged from the slide groove 402. This too is a complicated procedure.

SUMMARY OF THE INVENTION

The present invention has been devised to substantially eliminate the above discussed inconveniences inherent in the prior art viewfinder mounting and is intended to provide an improved viewfinder mounting of a type effective to permit the viewfinder to be adjustable smoothly in a common plane in two directions perpendicular to each other, wherein a single releasable lock member is employed to releasably lock the viewfinder with respect to such two directions.

It is a related object of the present invention to provide a viewfinder assembly including the viewfinder mounting of the type referred to above.

It is another object of the present invention to provide a video camera assembly including the viewfinder and the viewfinder mounting of the type referred to above.

In order to accomplish the foregoing object, the present invention provides a viewfinder mounting for mounting a viewfinder on a camera body for adjustable movement in a common plane in two directions perpendicular to each other. This viewfinder mounting comprises a first slide mechanism including first and second slide members coupled with each other for sliding movement relative to each other, and a second slide mechanism including third and fourth slide members coupled with each other for sliding movement relative to each other. A camera fixture is employed to connect the first slide member to the camera body, and a viewfinder fixture is also employed to connect the fourth slide member to the viewfinder. A holder connects the second and third slide members with each other to render the first and second slide members to lie perpendicular to each other. A slide lock means is provided for releasably locking the viewfinder fixture and the camera fixture relative to each other.

According to a preferred embodiment of the present invention herein disclosed, the first slide member includes first and second bearing bushings and the second slide member includes first and second slide rods extending parallel to each other and slidably inserted through the first and second bearing bushings. On the other hand, the third slide member includes a third bearing bushing and the fourth slide member includes a third slide rod slidably inserted through the third bearing bushing and extending substantially perpendicular to any one of the first and second slide rods. The first and second bearing bushings are carried by a camera fixture adapted to be coupled with the camera body while the first and second slide rods slidingly received by the respective first and second bearing bushings are carried by a holder in spaced and parallel relation to each other. The third slide rod is carried by the holder so as to extend perpendicular to any one of the first and second slide rods and has the third bearing bushing slidably mounted thereon. This third bearing bushing is coupled with the viewfinder fixture which is in turn coupled with the viewfinder.

While the third slide member may comprise two slide rods in association with a corresponding number of bearing bushings, means for restraining the third bearing bushings from moving angularly about the longitudinal axis of the third slide rod is employed where the single third slide rod is employed in association with the single third bearing bushing.

The slide lock means may preferably comprise a lock screw having a lock lever coupled with the lock screw so that when lock lever is turned about a longitudinal axis of the lock screw, the lock screw can be fastened or loosened to lock or release the viewfinder fixture relative to the camera fixture depending on the direction of turn of the lock lever, respectively. While all of the component parts of the viewfinder mounting are preferably made of metal, a lock piece made of synthetic resin is employed as a part of the slide lock means to avoid a metal-to-metal contact, that is, a frictional contact between a free end face of the lock screw and a part of the camera fixture, to thereby avoid the possibility that such part of the camera fixture may be scratched undesirably.

According to the present invention, repositioning of the viewfinder in two directions perpendicular to each other relative to the camera aiming direction can be accomplished merely by manipulating the slide lock means, i.e., turning the lock lever. No two separate adjustments such as required in the prior art viewfinder mounting is needed.

BRIEF DESCRIPTION OF THE DRAWINGS

These and other objects and features of the present invention will become clear from the following description taken in conjunction with preferred embodiments thereof with reference to the accompanying drawings, in which like parts are designated by like reference numerals and in which.

DETAILED DESCRIPTION OF THE EMBODIMENT

Figure 1:
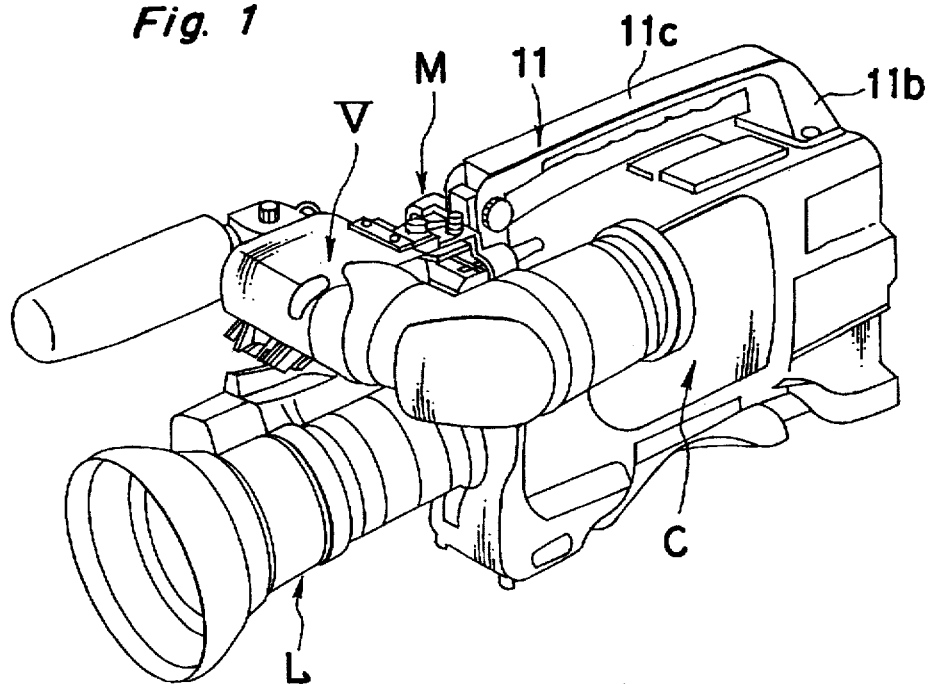
FIG. 1 is a perspective view a professional-grade video camera system utilizing a viewfinder mounting according to the present invention.
Figure 2:
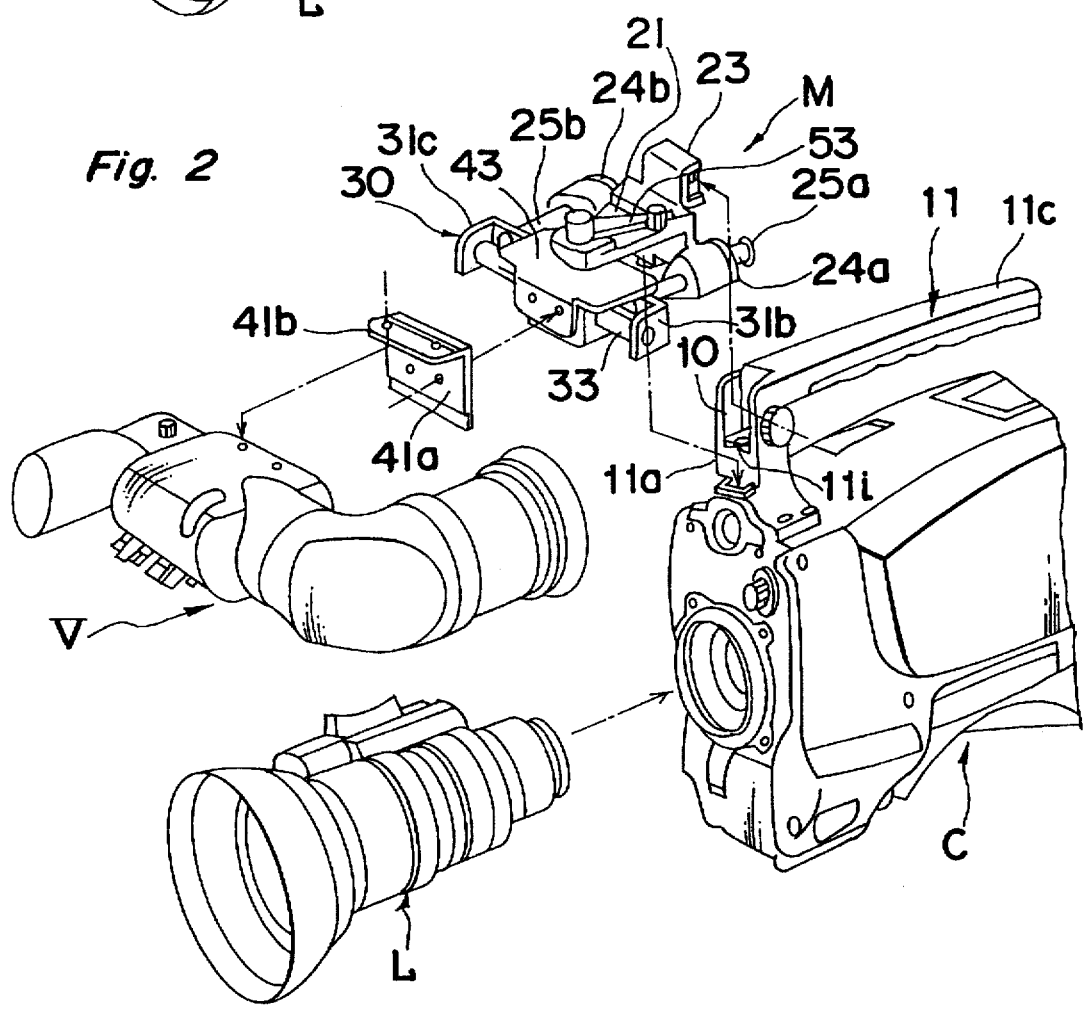
FIG. 2 is an exploded view, on a somewhat enlarged scale, of a front portion of the video camera system, with a lens assembly removed, showing the viewfinder mounting of the present invention.

Referring to the accompanying drawings and particularly to FIGS. 1 to 4, there is shown a professional-grade video camera system comprising a video camera body C, a viewfinder V and a viewfinder mounting M intervening between the video camera body and the viewfinder V. The video camera body is of a generally rectangular box-like configuration having an interchangeable lens assembly L fitted to a front wall of the camera body in any known manner. A generally inverted U-shaped handle 11 of one-piece construction having front and rear upright legs 11a and 11b and an elongated grip 11c extending between the front and rear upright legs 11a and 11b is mounted atop the video camera with respective lower ends of said front and rear upright legs 11a and 11b secured to, or otherwise formed integrally with, a top wall of the camera body C. The viewfinder V may be of any known structure and is, in the illustrated embodiment, of a generally L-shaped type having a transverse arm and an eyepiece unit which may be tiltably coupled to one end of the transverse arm. This viewfinder V is detachably mounted on the front upright leg 11a of the handle 11 through the viewfinder mounting M, which will subsequently be described in detail, with the eyepiece unit thereof extending rearwardly of the camera body C.

The front upright leg 11a of the handle has an upper portion formed with a mount socket 10 opening upwardly and, also, frontwardly and delimited by an upright spinal wall 11d, side walls 11e and 11f perpendicular to the upright spinal wall 11d and a bottom wall 11g substantially perpendicular to the upright spinal wall 11d. The upright spinal wall 11d has a pair of ribs 11h protruding into the mount socket 10 and extending in a direction parallel to the lengthwise direction of the front leg 11a. On the other hand, the bottom wall 11g has a recess 11i defined therein, the function of which recess 11 will be described later.

A camera fixture 20 of one-piece construction includes a generally rectangular depending plate 22 having a generally rectangular engagement block 23 integrally formed with an upper end of the depending plate 22 and positioned offset relative to the depending plate 22 so as to be received in the pocket 10 in the front upright leg 10a in a manner as will be described later. The depending plate 22 is formed with a generally horizontally extending triangular plate 21 protruding from the upper end of the depending plate 22 in a direction opposite to the engagement block 23 at right angles to the depending plate 22. It is to be noted that the triangular plate 21 referred to above forms a part of a slide lock mechanism as will be described later, but is preferably formed integrally with the depending plate 22.

The engagement block 23 is formed with parallel grooves 23a (See FIG. 5) and a projection 23b. The parallel grooves 23 are defined in a surface portion thereof confronting the upright spinal wall 11d of the front leg 11a which grooves 23a receive therein the corresponding ribs 11i in the upright spinal wall 11d when the engagement block 23 is received within the pocket 10. The projection 23b protrudes downwardly from a bottom surface of the engagement block 23 for engagement into the recess 11i when the engagement block 23 is received within the pocket 10.

The ribs 11i cooperable with the grooves 23a and the recess 11i cooperable with the projection 23b are utilized to ensure a firm hold of the engagement block 23 and, hence, the viewfinder mounting M with the viewfinder V mounted thereon, when the viewfinder mounting M is mounted on the camera body C with the engagement block 23 received within the pocket 10 in the front leg 11a. A lock screw 26 having a threaded shank 26a and a knob 26b at one end of the threaded shank 26a is employed to eliminate an accidental separation of the engagement block 23 from the pocket 10. This lock screw is loosely carried by one of the side walls, that is, the side wall 11f, of the front leg 11a with the threaded shank 26a threadingly engaged in the engagement block 23 and the knob 26b positioned laterally outside the side wall 11f.

Thus, it will readily be seen that to mount the viewfinder mounting M on the camera body C, the engagement block 23 has to be inserted into the pocket 10 with the ribs 11h received in the grooves 23a until the projection 23b is completely received within the recess 11i and, then, the lock screw 26 has to be fastened with the threaded shank 26a loosely extending across the side wall 11f and threaded into the engagement block 23.

The viewfinder mounting M comprises a front slide mechanism, which is coupled with and supports the view-finder V so as to permit the latter to be repositioned in a direction perpendicular to the camera aiming direction, and a rear slide mechanism which is carried by the camera body C so as to permit the front slide mechanism and, hence, the viewfinder V to be repositioned in a direction substantially parallel to the camera aiming direction.

The rear slide mechanism includes left and right bearing bushings 24a and 24b of a cylindrical configuration. The bearing bushings 24a and 24b may be fixedly secured to respective opposite side edges of the depending plate 22 in any suitable manner so as to occupy respective positions on opposite sides of the depending plate 22 with respective bores in said bearing bushings 24a and 24b oriented in a direction parallel to the camera aiming direction. In the illustrated embodiment, however, the bearing bushings 24a and 24b are formed integrally with the camera fixture 20, particularly the depending plate 22 thereof, by the use of, for example, a die casting technique together with the triangular plate 21.

The rear slide mechanism also includes slide rods 25a and 25b slidably extending through the respective bearing bushings 24a and 24b and having front ends connected together by means of a holder 30 in a manner as will be described later.

The holder 30 is of a generally U-shaped configuration including a transverse bar 31a having its opposite ends formed with respective arms 31b and 31c protruding therefrom in a direction parallel to the camera aiming direction. On one side of the transverse bar 31a opposite to the arms 31b and 31c, front ends of the slide rods 25a and 25b are rigidly connected to the transverse bar 31a by means of set screws 32 that extends across the transverse bar 31a and are then threaded into the respective front ends of the slide rods 25a and 25b. As will become clear from the subsequent description, the holder 30 serves to connect the rear slide mechanism with the front slide mechanism.

The front slide mechanism includes a transverse slide rod 33 carried by the arms 31b and 31c of the holder 30 so as to extend parallel to and spaced a distance from the transverse bar 31a of the holder 30, and a transverse bearing bushing 34 mounted on the transverse slide rod 33 for movement along the transverse slide rod 33. Specifically, the transverse slide rod 33 has one end formed with a radially outwardly protruding head and is fixed in position relative to the holder 30 by inserting it across the arm 31c until the other end thereof is brought into contact with the arm 31b and then firmly threading a set screw 35 across the arm 31b and into that end of the transverse slide rod 33. As will also become clear from the subsequent description, the transverse bearing bushing 34 is coupled rigidly to, or otherwise formed integrally with, a part of a viewfinder fixture generally identified by 40.

The viewfinder fixture 40 includes a generally inverted L-shaped bracket 41 including a depending plate 41a and an overlay plate 41b and is secured to the viewfinder C with the overlay plate 41b fixed thereto by means of set screws 42. This viewfinder fixture 40 also includes a lock table 43 connected to a generally intermediate portion of the depending plate 41a so as to protrude at right angles thereto in a direction towards the rear slide mechanism. The transverse bearing bushing 34 of the front slide mechanism discussed above is positioned in a corner region delimited between the depending plate 41a and the lock table 43 and is secured to the depending plate 41a by means of set screws 44 together with the lock table 43. However, the depending plate 41a, the transverse bearing bushing 34 and the lock plate 43 may be formed in one-piece construction by the use of any suitable die casting technique if so desired. It is to be noted that the lock table 43 referred to above forms another part of the slide lock mechanism and is cooperable with the triangular plate 21 in a manner as will be described subsequently. It is also to be noted that the lock table 43 has an upper surface, remote from the transverse bearing bushing 34, which is made flat.

The front slide mechanism is so positioned relative to the rear slide mechanism that in an assembled condition of the viewfinder mounting M the flat upper surface of the lock table 43 may slide substantially in contact with the undersurface of the triangular plate 21 during the adjustment of the viewfinder V in a direction parallel to the camera aiming direction with the slide rods 25a and 25b axially sliding relative to the associated bearing bushings 24a and 24b and also during the adjustment of the viewfinder V in a direction transverse to such camera aiming direction with the transverse slide rod 33 axially moving relative to the associated transverse bearing bushing 34.

In order to prevent the transverse bearing bushing 34 from arbitrarily turning around the transverse slide rod 33, a stopper means is provided for restricting a rotary motion of the transverse bearing bushing 34 relative to the transverse slide rod 33. This stopper means comprises a hooking member 45 integrally formed with the undersurface of the lock table 43 for engagement with a upper rear shoulder of the transverse bar 31a of the holder 30. This hooking member 45 may be in the form of a protuberance or a rib of a length corresponding to the length of the transverse bearing bushing 34. The stopper means may also include an adjustment screw 46 mounted on a rear projection of the transverse bearing bushing 34 and so positioned as to cooperable with the hooking member 45 to substantially embrace the transverse bar 31a. The use of the adjustment screw 46 is particularly advantageous in that by properly setting the adjustment screw 46 in position relative to the transverse bar 31a, any possible rattling motion of the transverse bearing bushing 34 relative to the transverse slide rod 43 can be avoided.

The slide lock mechanism is generally identified by 50 and will now be described. The slide lock mechanism 50 is utilized to lock the front and rear slide mechanisms relative to each other once the viewfinder V has been repositioned in one or both of the directions perpendicular to each other. The slide lock mechanism 50 includes an externally threaded lock screw 51 threadingly received in an internally threaded hole 52 defined in the triangular plate 21 at a location above the lock table 43, and a lock lever 53 having one end fixedly mounted on one end of the lock screw 51 situated outside the threaded hole 52. This slide lock mechanism 50 is so designed and so structured that, when the lock lever 53 is turned to fasten the lock screw 51, a free end face of the lock screw 51 remote from the lock lever 53 can be brought into contact with the flat upper surface of the lock table 43 to restrain movement of the triangular plate 21 relative to the lock table 43 and, hence, the rear slide mechanism relative to the front slide mechanism. If a metal-to-metal contact, that is, a frictional contact between the free end face of the lock screw 51 and the flat upper surface of the lock table 43 is considered undesirable or should be avoided for any reason, a lock piece 54 made of synthetic resin may be disposed below, or otherwise secured to, the end face of the lock screw 51. The use of the lock piece 54 is effective to eliminate the possibility that the flat upper surface of the lock table 43 may be scratched which would occur when the metal-to-metal contact takes place.

Figure 5:
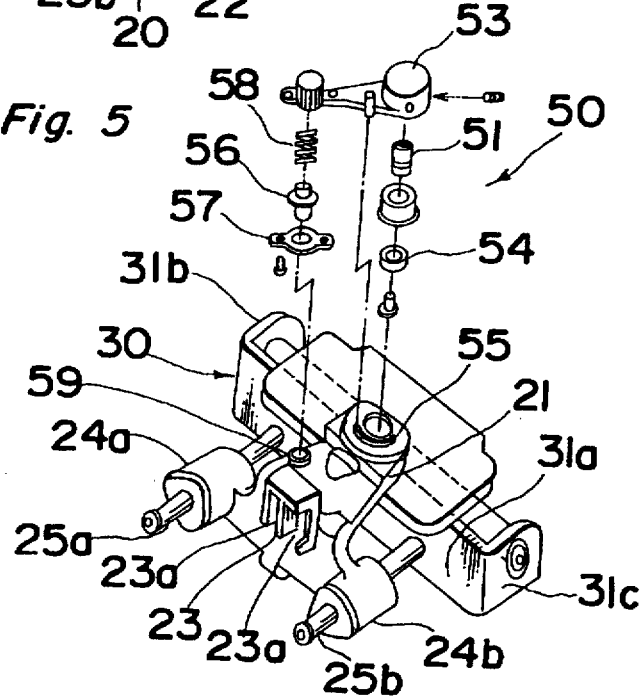
FIG. 5 is a perspective view of a portion of the viewfinder mounting showing the use of a detent mechanism for a slide lock mechanism of the viewfinder mounting.
Figure 6:
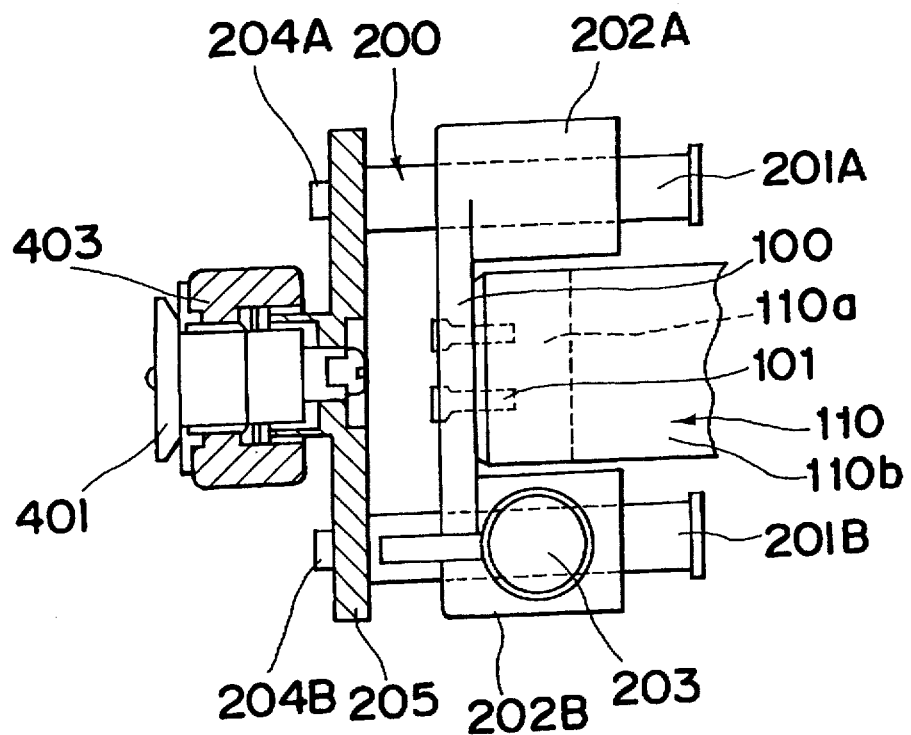
FIG. 6 is a top plan view, with a portion shown in section, of the prior art viewfinder mounting.
Figure 7:
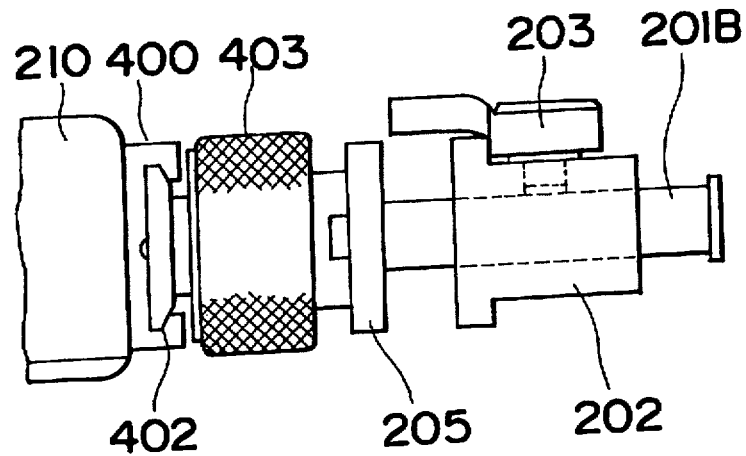
FIG. 7 is a side view of the prior art viewfinder mounting shown in FIG. 6.

If desired, means for restricting the angular movement of the lock lever 53 within a limited range may be employed, which may be comprised of a combination of a guide pin and a guide groove. For example, as shown in FIG. 5, the triangular plate 21 is formed with an arcuate guide groove 55 extending angularly a distance sufficient to allow the lock lever 53 to be turned, for example, about 90° about the axis of the lock screw 51, and a guide pin secured to a portion of the lock lever 54 immediately above the guide groove 55 and extending downwardly therefrom into the guide groove 55.

In addition, if desired, a detent mechanism may be provided for retaining the lock lever 53 in a lock or fastened position for avoiding any possible accidental turn of the lock lever 53 towards a loosened position. This detent mechanism is shown in FIG. 5 and comprises a detent pin 56 having one end loosely received within a pocket defined in a free end portion of the lock lever 53 and retained in position by a retainer 57, a biasing spring 58 accommodated within the pocket in the free end portion of the lock lever 53 for urging the detent pin 56 downwardly, and a detent recess 59 defined in a portion of the triangular plate 21 corresponding to the fastened position. This detent mechanism is so designed that as the lock lever 53 being turned in a fastening direction approaches the fastened position, the detent pin 56 can be slid into the detent recess 59 to thereby retain the lock lever 53 at the fastened position, but as the lock lever 53 in the fastened position is turned in a loosening direction, the detent pin 56 can slide over a wall around the detent recess 59 onto an upper surface of the triangular plate 21 against the biasing spring 58 to thereby escape from the detent recess 59.

A look-through hole of a generally triangular configuration identified by 60 is formed in the triangular plate 21 so that a cameraman can mark on the triangular plate 21 through such look-through hole 60 a suitable indicia representative of an optimum viewfinder position ergonomic to the cameraman. Therefore, even though the position of one of the front and rear slide mechanisms relative to the other thereof is varied by any reason, the cameraman can reposition them to set the viewfinder at the optimum viewfinder position making reference to the indicia marked on the triangular plate 21 through the look-through hole 60.

The viewfinder mounting M of the above described construction is used in the following manner. Assuming that the viewfinder mounting M has the viewfinder V mounted thereon, that is, the viewfinder V is coupled with the viewfinder fixture 40 in the manner as hereinbefore described, the viewfinder mounting M is mounted on the camera body C with the engagement block 23 inserted into the pocket 10 defined in the front leg 11a of the handle 11. As the engagement block 23 is inserted into the pocket 10, the ribs 11h are slidingly received within the grooves 23a in the engagement block 23, and at the time of complete insertion of the guide block 23 in the pocket 20, the projection 23b integral with the engagement block 23 is received within the recess 11i. In this way, a temporal mounting of the viewfinder mounting M on the camera body C completes. However, fastening of the threaded shank 26a of the lock screw 26 into the engagement block 23 through the side wall 11f results in complete mounting of the viewfinder mounting M on the camera body C.

Figure 3:
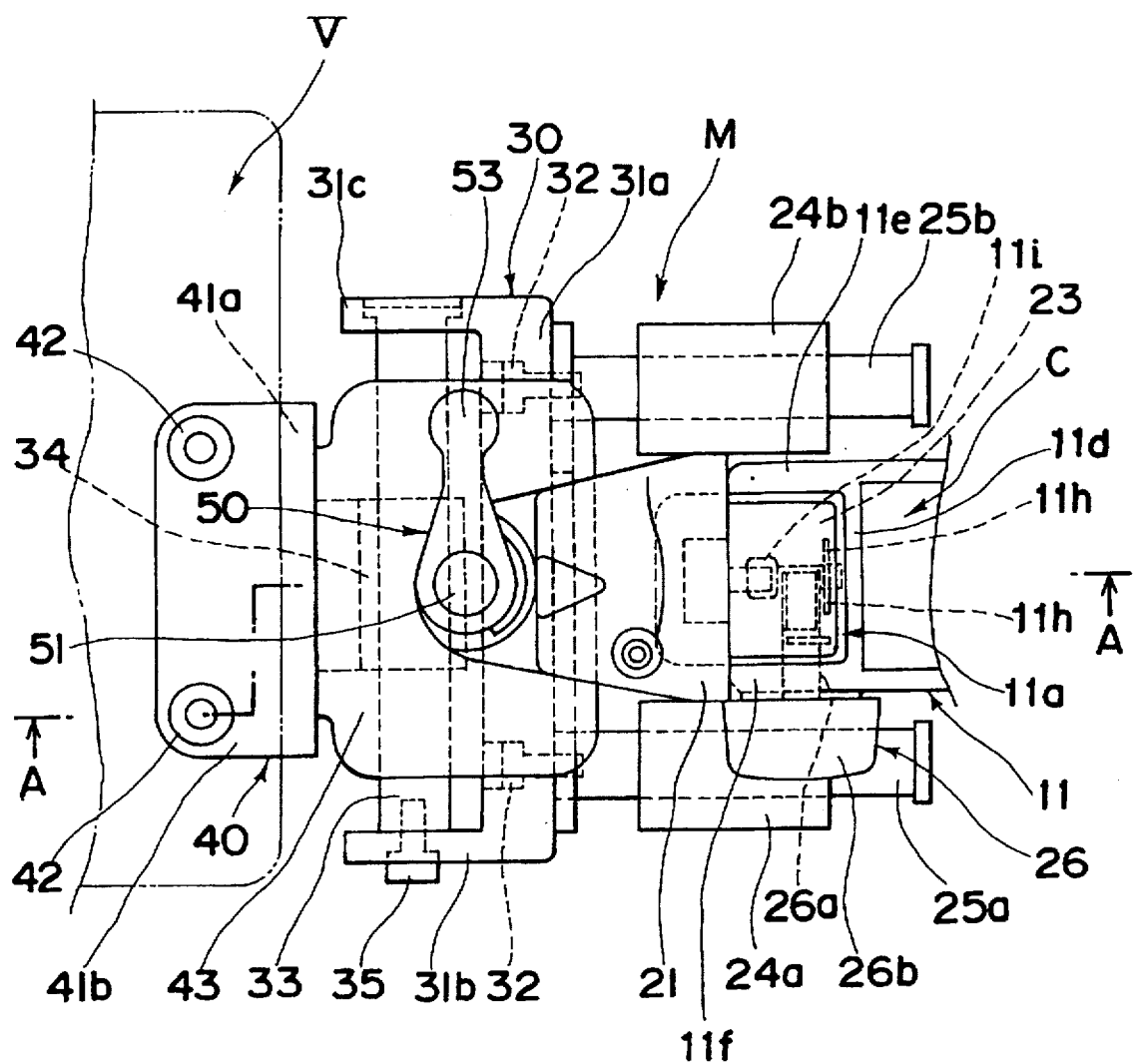
FIG. 3 is a fragmentary top plan view of the viewfinder mounting of the present invention.
Figure 4:
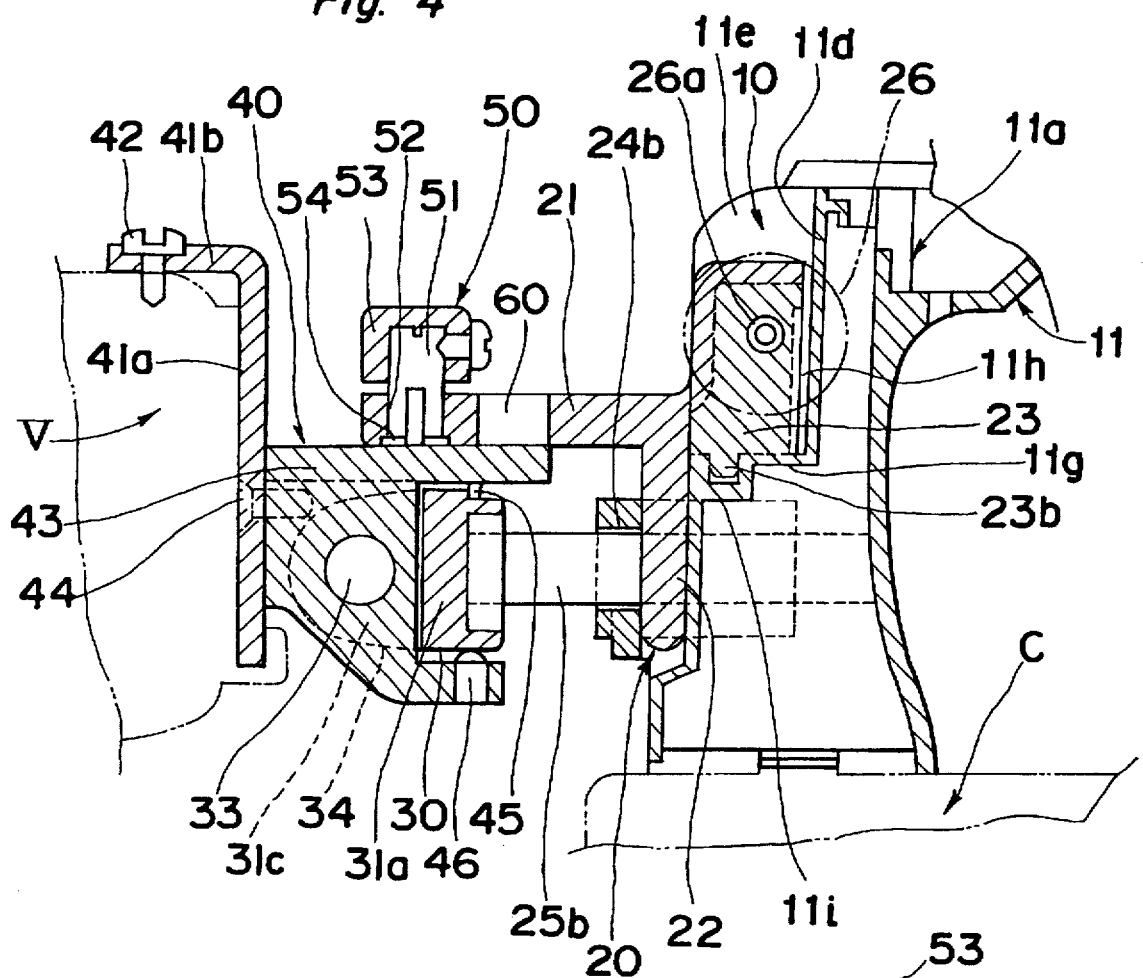
FIG. 4 is a side sectional view of the viewfinder mounting shown in FIG. 3.

In this completely mounted condition, and when the lock lever 53 is turned counterclockwise as viewed in FIG. 3 from the fastened position towards the loosened position with the lock piece consequently disengaged from the flat upper surface of the lock table 43, the viewfinder V mounted on the viewfinder mounting M can be repositioned in a plane in two directions perpendicular to each other. Specifically, when the viewfinder V is pushed or pulled in a direction conforming to the camera aiming direction, the slide rods 25a and 25b slide relative to the associated bearing bushings 24a and 24b, but when the viewfinder V is pushed or pulled in a direction perpendicular to the camera aiming direction, the transverse slide rod 33 slides relative to the corresponding bearing bushing 34. After the repositioning of the viewfinder V in the manner described above, the lock lever 53 has to be turned clockwise, as viewed in FIG. 3, from the loosened position towards the fastened position to lock the first and second slide mechanisms together in the manner described above.

Removal of the viewfinder mounting M from the camera body C can be accomplished simply by loosening the lock screw 26. The camera body C and the viewfinder mounting M with the viewfinder V thereon are then accommodated within a carrying case for transportation from place to place.

Although the present invention has been described in connection with the preferred embodiments thereof with reference to the accompanying drawings, it is to be noted that various changes and modifications are apparent to those skilled in the art. In the illustrated embodiment, the bearing bushings 24a and 24b have been shown as integrally formed with the camera fixture 20 and the corresponding slide rods 25a and 25b have been shown as carried by the holder 30. However, the bearing bushings 24a and 24b and the corresponding slide rods 25a and 25b may be reversed in position. In other words, the bearing bushings 24a and 24b may be carried by the holder 30 and the slide rods 25a and 25b may be connected to the camera fixture 20.

Also, although in the foregoing illustrated embodiment the rear slide mechanism has been shown as including the two slide rods 25a and 25b in combination with the corresponding bearing bushings 24a and 24b, only one slide rod in combination with the bearing bushing may be employed. Where only one of the slide rods 25a or 25b in combination with the bearing bushing 24a or 24b is employed, another stopper means is necessary to avoid a rotation of the slide rod relative to the bearing bushing which may comprise, for example, at least one splined projection and a corresponding splined groove. However, the use of the two slide rods in combination with the corresponding bearing bushings is effective to avoid an undesirable tilt of the front slide mechanism relative to the rear slide mechanism, without requiring the use of such stopper means.

In addition, the front slide mechanism has been shown as including the single transverse slide rod 33 in combination with the single transverse bearing bushing 34, it may include two transverse slide rods in combination with correspondingly two transverse bearing bushings. Where the front slide mechanism includes the two transverse slide rods in combination with the correspondingly two transverse bearing bushings, the stopper means such as shown as comprised of the hooking member 45 can be dispensed with.

Yet, the front and rear slide mechanisms, which have been shown as positioned adjacent the viewfinder V and the camera body C, respectively, may be reversed in position relative to each other. In other words, although in the illustrated embodiment the slide rods 25a and 25b received in the bearing bushings 24a and 24b have been shown as extending in a direction substantially parallel to the camera aiming direction with the transverse slide rod 33 in the transverse bearing bushing 34 extending perpendicular to the camera aiming direction, the slide rods 25a and 25b in the bearing bushings 24a and 24b may be disposed so as to extend in a direction perpendicular to the camera aiming direction with the transverse slide rod 33 in the transverse bearing bushing 34 extending in a direction parallel to the camera aiming direction.

Moreover, although in the foregoing illustrated embodiment the triangular plate 21 on which the slide lock mechanism 50 is mounted has been shown as provided on the camera fixture 20 and the lock table 42 has been shown as provided on the viewfinder fixture 40, the triangular plate 21 with the slide lock mechanism 50 thereon may be provided on the viewfinder fixture 40 while the lock table 42 may be provided on the camera fixture 20.

Furthermore, while in the foregoing illustrated embodiment a lock is accomplished by sandwiching the lock table 43 between the slide lock mechanism 50 and the hooking member 45, arrangement may be made in which an arm is formed with a base end of the triangular plate 21 adjacent the depending plate 22 so as to extend beneath the lock table to a position immediately below the slide lock mechanism 50 so that the lock table 43 can be sandwiched between the slide lock mechanism 50 and such arm.

Yet, although the component parts of the viewfinder mounting in the illustrated embodiment except for the lock piece have been described as preferably made of metal, those skilled in the art will readily understand that some or all of such component parts of the viewfinder mounting of the present invention may be made of plastics.

Such changes and modifications are to be understood as included within the scope of the present invention as defined by the appended claims, unless they depart therefrom.

What is claimed is:

1. A viewfinder mounting for mounting a viewfinder on a camera body for adjustable movement in first and second directions perpendicular to each other, said viewfinder mounting comprising:

a first slide mechanism including a first bearing member and a first elongated member slidably carried by said first bearing member for movement relative to said first bearing member in a first direction;

second slide mechanism including a second bearing member and a second elongated member slidably carried by said second bearing member for movement relative to said second bearing member in a second direction perpendicular to said first direction;

a holder for:
  (a) connecting said first elongated member with said second bearing member to permit said first elongated member to extend transverse to said second elongated member, and
  (b) supporting said second elongated member;

a camera fixture for detachably coupling one of said first slide mechanism and said second slide mechanism to the camera body;

a viewfinder fixture for detachably coupling the other of said first slide mechanism and said second slide mechanism to the viewfinder; and slide lock means for releasably locking together said viewfinder fixture and said camera fixture and including:
  (a) a lock table connected with said viewfinder fixture and having a flat surface lying in a plane parallel to one of said first elongated member and said second elongated member,
  (b) a lock plate connected to camera fixture, and
  (c) a releasable lock member mounted on said lock plate and engageable with said flat surface of said lock table to lock said lock table to said lock plate.

2. A viewfinder mounting as claimed in claim 1, wherein said first elongated member includes first and second slide rods extending parallel to each other and first and second bushings through which said first slide rod and said second slide rod, respectively, slidably extend.

3. A viewfinder mounting as claimed in claim 2, wherein said second elongated member includes a third slide rod extending transverse to one of said first slide rod and said second slide rod and said second bearing member includes a third bushing through which said third slide rod slidably extends.

4. A viewfinder mounting as claimed in claim 1, further comprising stopper means for restricting rotary motion of said first elongated member relative to said first bearing means.

5. A viewfinder mounting as claimed in claim 1, further comprising stopper means for restricting rotary motion of said second elongated member relative to said second bearing means.

6. A viewfinder mounting as claimed in claim 1, wherein said lock table has threaded hole and said releasable lock member has a threaded shank engageable in said threaded hole and having a first end engageable with said flat surface of said lock table to lock said lock table to said lock plate.

7. A viewfinder mounting as claimed in claim 6, wherein said releasable lock member has a lock lever at a second end of said threaded shank remote from said flat surface of said lock table.

8. A viewfinder mounting as claimed in claim 1, further comprising a lock piece formed of a synthetic resin fitted to said first end of said threaded shank and said first end of said threaded shank is engageable with said flat surface of said lock table through said lock piece.

9. A viewfinder mounting as claimed in claim 1, wherein said releasable lock member urges said lock table against said holder.

10. A viewfinder mounting for mounting a viewfinder on a camera body for adjustable movement in first and second directions perpendicular to each other, said viewfinder mounting comprising:

a first slide mechanism including a first bearing member and a first elongated member slidably carried by said first bearing member for movement relative to said first bearing member in a first direction;

a second slide mechanism including a second bearing member and a second elongated member slidably carried by said second bearing member for movement relative to said second bearing member in a second direction perpendicular to said first direction;

a holder for:
  (a) connecting said first elongated member with said second bearing member to permit said first elongated member to extend transverse to said second elongated member, and
  (b) supporting said second elongated member;

a camera fixture for detachably coupling one of said first slide mechanism and said second slide mechanism to the camera body;

a viewfinder fixture for detachably coupling the other of said first slide mechanism and said second slide mechanism to the viewfinder; and slide lock means for releasably locking together said viewfinder fixture and said camera fixture and including:
  (a) a lock table connected with said camera fixture and having a flat surface lying in a plane parallel to one of said first elongated member and said second elongated member,
  (b) a lock plate connected to viewfinder fixture, and
  (c) a releasable lock member mounted on said lock plate and engageable with said flat surface of said lock table to lock said lock table to said lock plate.

11. A viewfinder mounting as claimed in claim 10, wherein said first elongated member includes first and second slide rods extending parallel to each other and first and second bushings through which said first slide rod and said second slide rod, respectively, slidably extend.

12. A viewfinder mounting as claimed in claim 11, wherein said second elongated member includes a third slide rod extending transverse to one of said first slide rod and said second slide rod and said second bearing member includes a third bushing through which said third slide rod slidably extends.

13. A viewfinder mounting as claimed in claim 10, further comprising stopper means for restricting rotary motion of said first elongated member relative to said first bearing means.

14. A viewfinder mounting as claimed in claim 10, further comprising stopper means for restricting rotary motion of said second elongated member relative to said second bearing means.

15. A viewfinder mounting as claimed in claim 10, wherein said lock table has threaded hole and said releasable lock member has a threaded shank engageable in said threaded hole and having a first end engageable with said flat surface of said lock table to lock said lock table to said lock plate.

16. A viewfinder mounting as claimed in claim 15, wherein said releasable lock member has a lock lever at a second end of said threaded shank remote from said flat surface of said lock table.

17. A viewfinder mounting as claimed in claim 10, further comprising a lock piece formed of a synthetic resin fitted to said first end of said threaded shank and said first end of said threaded shank is engageable with said flat surface of said lock table through said lock piece.

18. A viewfinder mounting as claimed in claim 10, wherein said releasable lock member urges said lock table against said holder.

19. A viewfinder mounted with a viewfinder mounting as defined by claim 1.

20. A camera assembly comprising a camera mounted with a viewfinder mounting as defined by claim 1.

21. A camera assembly comprising a camera, a viewfinder and a viewfinder mounting as defined by claim 1 for mounting said viewfinder on said camera.

22. A camera assembly as claimed in claim 20, wherein:
  (a) said camera fixture of said viewfinder mounting includes an engagement piece engaging said camera and having a threaded hole, and
  (b) said camera includes a screw member threadingly engaged in said threaded hole in said engagement piece to secure said viewfinder mounting to said camera.

23. A camera assembly as claimed in claim 21, wherein:
  (a) said camera fixture of said viewfinder mounting includes an engagement piece engaging said camera and having a threaded hole, and
  (b) said camera includes a screw member threadingly engaged in said threaded hole in said engagement piece to secure said viewfinder mounting to said camera.

24. A viewfinder mounted with a viewfinder mounting as defined by claim 10.

25. A camera assembly comprising a camera mounted with a viewfinder mounting as defined by claim 10.

26. A camera assembly comprising a camera, a viewfinder and a viewfinder mounting as defined by claim 10 for mounting said viewfinder on said camera.

27. A camera assembly as claimed in claim 25, wherein:
   (a) said camera fixture of said viewfinder mounting includes an engagement piece engaging said camera and having a threaded hole, and
   (b) said camera includes a screw member threadingly engaged in said threaded hole in said engagement piece to secure said viewfinder mounting to said camera.

28. A camera assembly as claimed in claim 26, wherein:
   (a) said camera fixture of said viewfinder mounting includes an engagement piece engaging said camera and having a threaded hole, and
   (b) said camera includes a screw member threadingly engaged in said threaded hole in said engagement piece to secure said viewfinder mounting to said camera.

* * * * *